United States Patent
Lev (10) Patent No.: US 12,155,343 B2
(45) Date of Patent: Nov. 26, 2024

(54) SOLAR PANEL BASED INDOOR LOW POWER SENSORS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 18/070,511

(22) Filed: Nov. 29, 2022

(65) Prior Publication Data

US 2024/0178786 A1    May 30, 2024

(51) Int. Cl.
| | |
|---|---|
| *H02S 20/30* | (2014.01) |
| *H02S 10/20* | (2014.01) |
| *H02S 30/10* | (2014.01) |
| *H02S 40/22* | (2014.01) |

(52) U.S. Cl.
CPC .............. *H02S 20/30* (2014.12); *H02S 10/20* (2014.12); *H02S 30/10* (2014.12); *H02S 40/22* (2014.12)

(58) Field of Classification Search
CPC .......... H02S 20/30; H02S 10/20; H02S 30/10; H02S 40/22; H02S 20/20
See application file for complete search history.

(56) References Cited

U.S. PATENT DOCUMENTS

| | | | | |
|---|---|---|---|---|
| 2004/0184728 A1* | 9/2004 | Miao | ........................ | G02B 6/32 385/33 |
| 2007/0175599 A1* | 8/2007 | Froese | .................... | F21S 9/037 160/10 |
| 2012/0291849 A1* | 11/2012 | Fata | .................... | H01L 31/0543 136/246 |
| 2014/0190562 A1* | 7/2014 | Teshima | ................ | H01L 31/049 136/256 |
| 2018/0115277 A1* | 4/2018 | Chapman | ................ | H02S 40/32 |

* cited by examiner

Primary Examiner — Michael Y Sun (57) ABSTRACT

A system and associated method include a housing that includes a sensor, a transmitter, and a power source. A solar panel is configured to receive light energy from an artificial light source to generate an electrical charge. An electrical connection may convey the electrical charge to the power source to energize the sensor, and a fastener fixates the solar panel within 10 cm of the artificial light source. The solar panel may be further positioned with respect to the housing and the artificial light source. For instance, the solar panel may be positioned so as to minimally obstruct visible light from the artificial light source within an area to be illuminated. The housing may comprise part of an Internet of Things (IoT) device.

15 Claims, 9 Drawing Sheets

SOLAR PANEL BASED INDOOR LOW POWER SENSORS

FIELD AND BACKGROUND OF THE INVENTION

The present invention, in some embodiments thereof, relates to networked sensors and transmitters, and more particularly, but not exclusively, to supplying power to Internet of Things (IoT) devices.

Sensors are used in homes and workplaces as an integral part of the Internet of Things (IoT). Broadly speaking, sensors are devices that detect and respond to changes in an environment. Inputs can come from a variety of sources, such as light, temperature, motion and pressure. Sensors output valuable information, and if they are connected to a network, they can share data with other connected devices and management systems.

In this manner, sensors can be used to warn a user of imminent or potential problems to allow hospitals and other businesses to perform predictive maintenance and avoid costly downtime. The data from sensors can also be analyzed for trends to allow business owners to gain insight into crucial trends and make informed, evidence-based decisions.

Sensors come in many shapes and sizes. Some are purpose-built containing many built-in individual sensors, allowing monitoring or multiple sources of data. For instance, accelerometers detect an object's acceleration (i.e., the rate of change of the object's velocity with respect to time). Accelerometers can also detect changes to gravity. In another example, proximity sensors are used for non-contact detection of objects near the sensor. These types of sensors often emit electromagnetic fields or beams of radiation such as infrared. Optical sensors convert rays of light into electrical signals, and level sensors are used to detect the level of substances including liquids, powders and granular materials.

IoT devices, in particular, can be made to be relatively small. However, such size advantages can be undermined when the IoT device must include bulky wiring for power considerations. Power and wiring requirements can also complicate installation.

SUMMARY OF THE INVENTION

According to an aspect of some embodiments of the present invention there is provided an apparatus comprising a housing that includes a sensor, a transmitter, and a power source. The apparatus further includes a solar panel configured to receive light energy from an artificial light source to generate an electrical charge. An electrical connection may be configured to convey the electrical charge to the power source to energize the sensor, and a fastener is configured to fixate the solar panel within 10 cm of the artificial light source.

According to some embodiments of the invention, the solar panel is positioned with respect to the housing and the artificial light source. For instance, the solar panel may be positioned so as to minimally obstruct visible light from the artificial light source within an area to be illuminated.

According to some embodiments of the invention, the apparatus of an embodiment may comprise an Internet of Things (IoT) device. The solar panel may include a backside oriented away from the artificial light source, and the backside is coated or colored to minimize visual impact of the backside The fastener may include at least one of: an adhesive, a threaded surface, a hook and loop fastener, tape, a snap, a mating connection, a clamp, a bolt, a pin, a retaining ring, a band, and a strap.

According to some embodiments of the invention, the solar panel is directionally adjustable. When configured, the surface area of the solar panel is manually adjustable.

According to some embodiments of the invention, a lens may be attached to at least one of the housing and the solar panel, the lens configured to focus the light energy onto the solar panel. The lens may be at least one of a magnifying lens and a Fresnel lens.

According to some embodiments of the invention, the apparatus includes an adjustable extending arm connecting the solar panel to the housing. In another or the same embodiment, an adjustable extending arm connecting the housing to the artificial light source. In either case, the adjustable extending arm may be configured to be at least one of: telescoping, rotating, and pivoting.

According to some embodiments of the invention, a first surface of the fastener is integral with the housing, and a second surface of the fastener is attachable to the artificial light source. In an embodiment, the fastener attaches at least one of the solar panel and the housing, and to the artificial light source.

According to other aspects of some embodiments of the present invention, there is provided a method of manufacturing a sensor system that includes providing housing including a sensor, a transmitter, and a power source, as well as connecting the solar panel and the housing using an electrical connection. The solar panel receives light energy from an artificial light source and generates an electrical charge. The electrical connection may be configured to convey the electrical charge to the power source. The method may further include fastening the housing or the solar panel to an artificial light source. The solar panel may be positioned within 10 cm of the artificial light source.

According to some embodiments of the invention, the method further comprises attaching a mirror to at least one of the housing and the solar panel. The mirror may be configured to reflect the light energy onto the solar panel. The method may further include supplying power from the solar panel to an additional Internet of Things (IoT) device.

According to some embodiments of the invention, the solar panel may be attached to the housing as either an aftermarket product. Alternatively, the solar panel may comprise an original equipment manufacturer (OEM) product. A processor of an embodiment may be used to execute a management software application to recommend an adjustment of a positioning of at least one of the solar panel and the housing based on a potential light energy exposure and a potential obstruction of light from the illuminated area.

According to some embodiments of the invention, the solar panel is attached using a panel mount connector comprising the electrical connection. In another or the same embodiment, attaching the solar panel further comprises attaching a framework structure comprising a plurality of interconnected solar panels, wherein apertures in between respective solar panels in the framework allow light from the artificial light source to reach a desired illuminated area.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to networked sensors and transmitter, and more particularly, but not exclusively, to supplying power to Internet of Things (IoT) devices.

An IoT sensor/transmitter may include a small, attached solar panel. Illustrative IoTs may include: a camera, a humidity sensor, a temperature sensor, a smoke detector, a Bluetooth low energy (BLE) beacon, an accelerometer, a gyroscope, as well as pressure, proximity, optical, and level sensors, among others. In one example, the solar panel may be attached with sticky, transparent glue or tape proximate to a light source, such as a light emitting diode (LED). The solar panel may be positioned as close to the artificial light source as possible (e.g., so as to minimize light energy attenuation) without substantially blocking light from illuminating a target area. In this manner, an embodiment of the system may operate whenever the light source is on with minimal or no cables or installation.

The methods and apparatus of exemplary embodiments may take the form, at least partially, of program code (i.e., instructions) embodied in tangible media, such as disks, CD-ROMs, hard drives, random access or read only-memory, or any other machine-readable storage medium, including transmission medium. When the program code is loaded into and executed by a machine, such as a computer, the machine becomes an apparatus for practicing the embodiments described herein. The media can include portions in different system components, such as memory in a host, an application instance, and or, a management station. The methods and apparatus may be embodied in the form of program code that may be implemented such that when the program code is received and loaded into and executed by a machine, such as a computer, the machine becomes an apparatus for practicing the embodiments described herein. When implemented on a processor, the program code combines with the processor to provide a unique apparatus that operates analogously to specific logic circuits. The program code (software-based logic) for carrying out the method is embodied as part of the system described below.

It is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
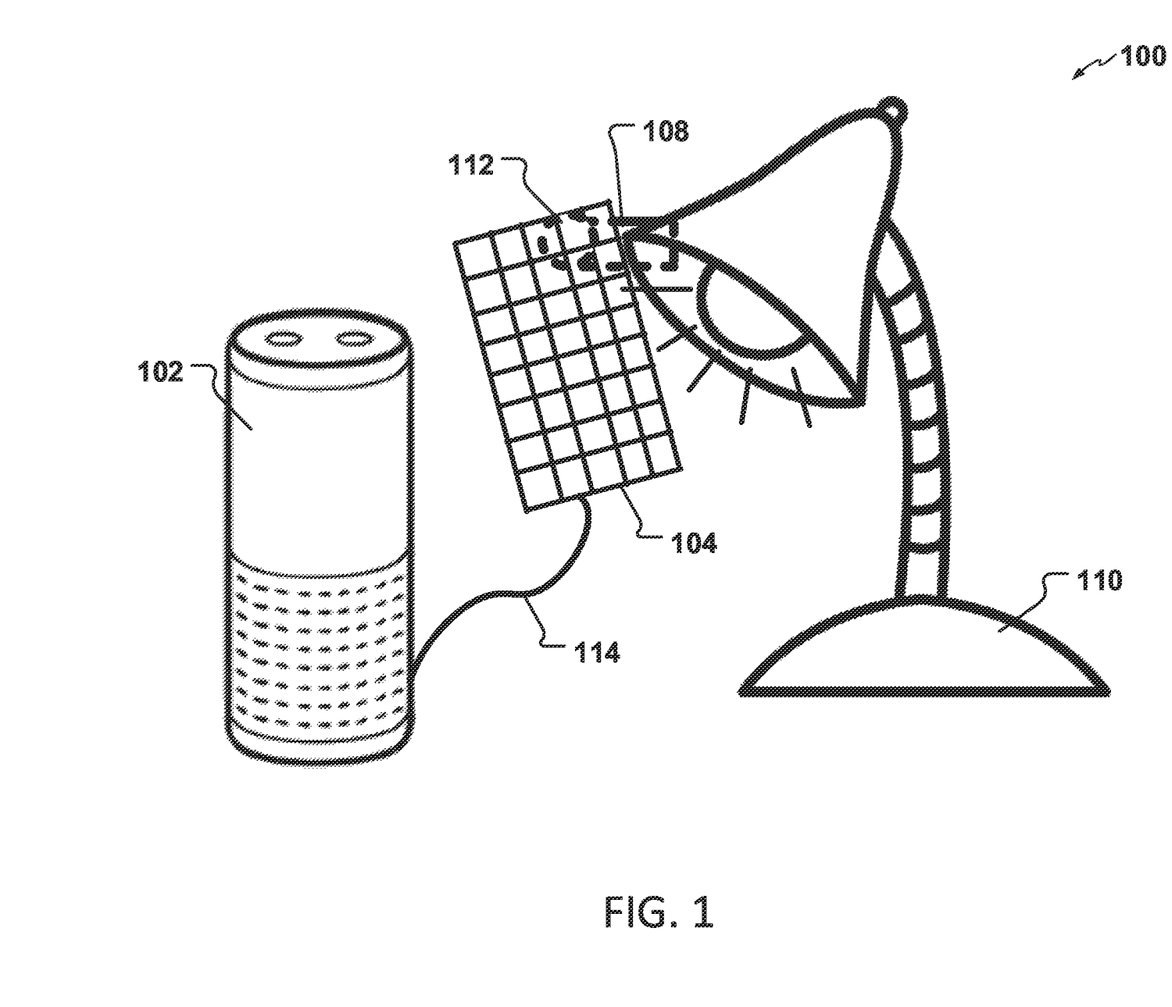
FIG. 1 illustrates a simplified schematic illustration of a system that includes an IoT device electrically coupled to a solar panel that is attached to an artificial light source using a fastener.

Referring now to the drawings, FIG. 1 illustrates a simplified schematic illustration of a system 100, or apparatus, which includes an Internet of Things (IoT) device 102 electrically coupled to a solar panel 104 that is attached to an artificial light source 106 using a fastener 108. As shown in the embodiment of the system 100, the fastener 108 includes a pivoting feature 112, depicted using dashed lines. The fastener 108 shown in FIG. 1 may comprise an adjustable tab having a sticky surface comprising, for instance, an adhesive surface or one-sided sticky tape.

The solar panel 104 may be rotated, oriented, or otherwise positioned within 10 cm of the artificial light source 110. For purposes of this disclosure, the 10 cm distance represents an outer boundary of desired positioning, but it should be understood that any increment less than 10 cm may be implemented as desired. Generally, the solar panel 104 will be positioned as close to the artificial light source 110 as is safe and plausible, as light energy can dissipate exponentially as it travels from the source.

Further regarding the positioning of the solar panel 104, the solar panel 104 is typically positioned such that it obstructs the least amount of light from the artificial light source 110. For example, the solar panel 104 may be fixated to an outside or inside surface of a lampshade the artificial light source 110 such that light is not blocked in an area on a desk that a user may wish to remain illuminated.

The size and shape of the solar panel 104 may be determined and deployed according to power needs of the IoT device 102 as well as considerations regarding light availability and potential obstruction of light. Although a single solar panel 104 is illustrated in FIG. 1, multiple solar panels may be arranged and used in certain embodiments of the system as discussed herein.

Light energy emanating from the artificial light source 110 may impact the surface of the solar panel 104. The solar panel 104 may use the light energy to generate an electrical charge that is communicated via wiring or another electrical connection 114 to the IoT device 102.

Figure 2:
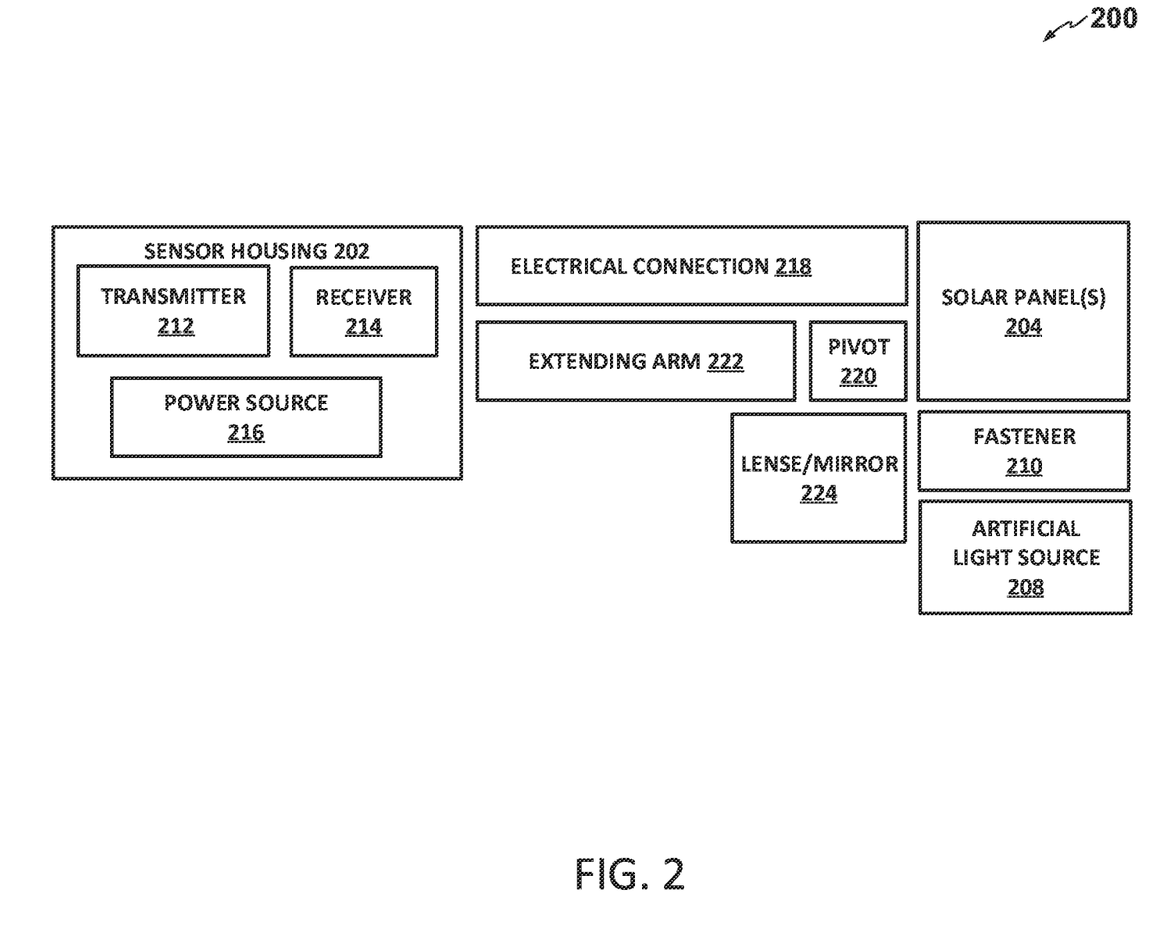
FIG. 2 is a block diagram illustrating an embodiment of a system that includes a sensor housing that is coupled via an electrical connection to a solar panel.

FIG. 2 is a block diagram illustrating an embodiment of a system 200 that includes a sensor housing 202 that is coupled via an electrical connection 204 to a solar panel 206. A solar panel may be detachably fastened to an artificial light source 208 via a fastener 210. An embodiment of the solar panel 204 may comprise a plurality of high concentrated photovoltaic (CPV) cells.

The housing 202 may be of a type associated with a sensor, such as an IoT device. The illustrative housing 202 may include a transmitter module 212 and a receiver module 214, as well as a power source 216. The receiver module 214 may comprise a sensing or detecting component particular to the type of sensor. The transmitter module 212 may communicate the results or detected input from the receiver 214 to an Internet or Ethernet network exchange. The power source 216 may comprise a rechargeable battery or power input component configured to convey the electrical charge generated by the solar panel 206 to the sensor.

The electrical connection 218 may comprise a panel mount or cabling/wiring. The fastener 210 may couple to one, two, or all three of the housing 102, solar panel 204, and artificial light source 208. An embodiment of the fastener 210 may be detachable or may be permanently affixed. The fastener 210 may be adjustable to better position the solar panel 204. To this end, fastener 210 may include a pivot 220. An extending arm 222 may be attached to the solar panel 204 and the sensor housing 202. The extending arm 222 may be adjustable to better position the solar panel with respect to the artificial light source 208. For instance, the extending arm 222 may be. The extending arm 222 of another or the same embodiment may be attachable to the artificial light source 208, in addition to at least one of the solar panel 204 and the sensor housing 202. A lens or mirror 224 may be positioned to redirect or focus light from the artificial light source 208 onto the solar panel 204.

Figure 3:
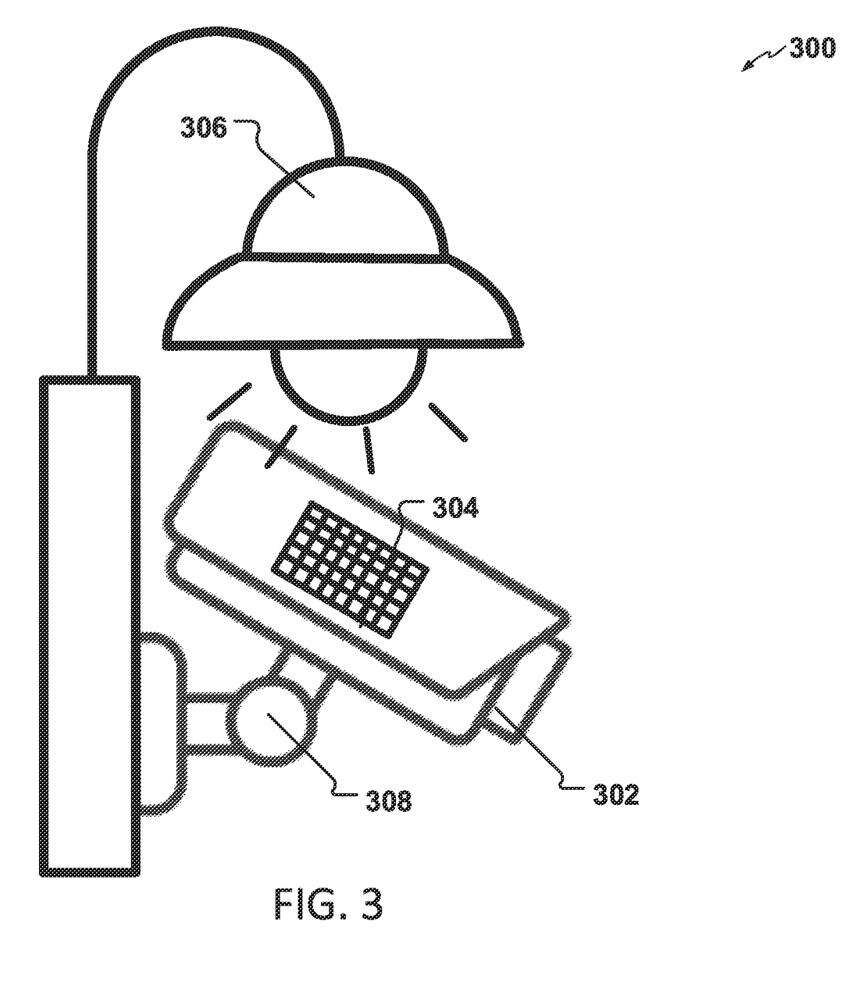
FIG. 3 is a schematic diagram illustrating a system that includes an IoT device (e.g., a security camera) powered by an attached solar panel that is positioned within 10 cm of an artificial light source.

FIG. 3 is a schematic diagram illustrating a system 300 that includes an IoT device (e.g., a security camera) 302 powered by an attached solar panel 304 that is positioned within 10 cm of an artificial light source 306. The solar panel 304 may be affixed to the IoT device 302 by mount connectors, adhesive, screws, or another fastener type.

Both the IoT device 302 and the solar panel 304 may be attached to the artificial light source 306 using an extending arm 308. The extending arm 308 may be adjustable to position the solar panel 304 as close to the artificial light source 306 as aesthetically and functionally desirable.

Figure 4:
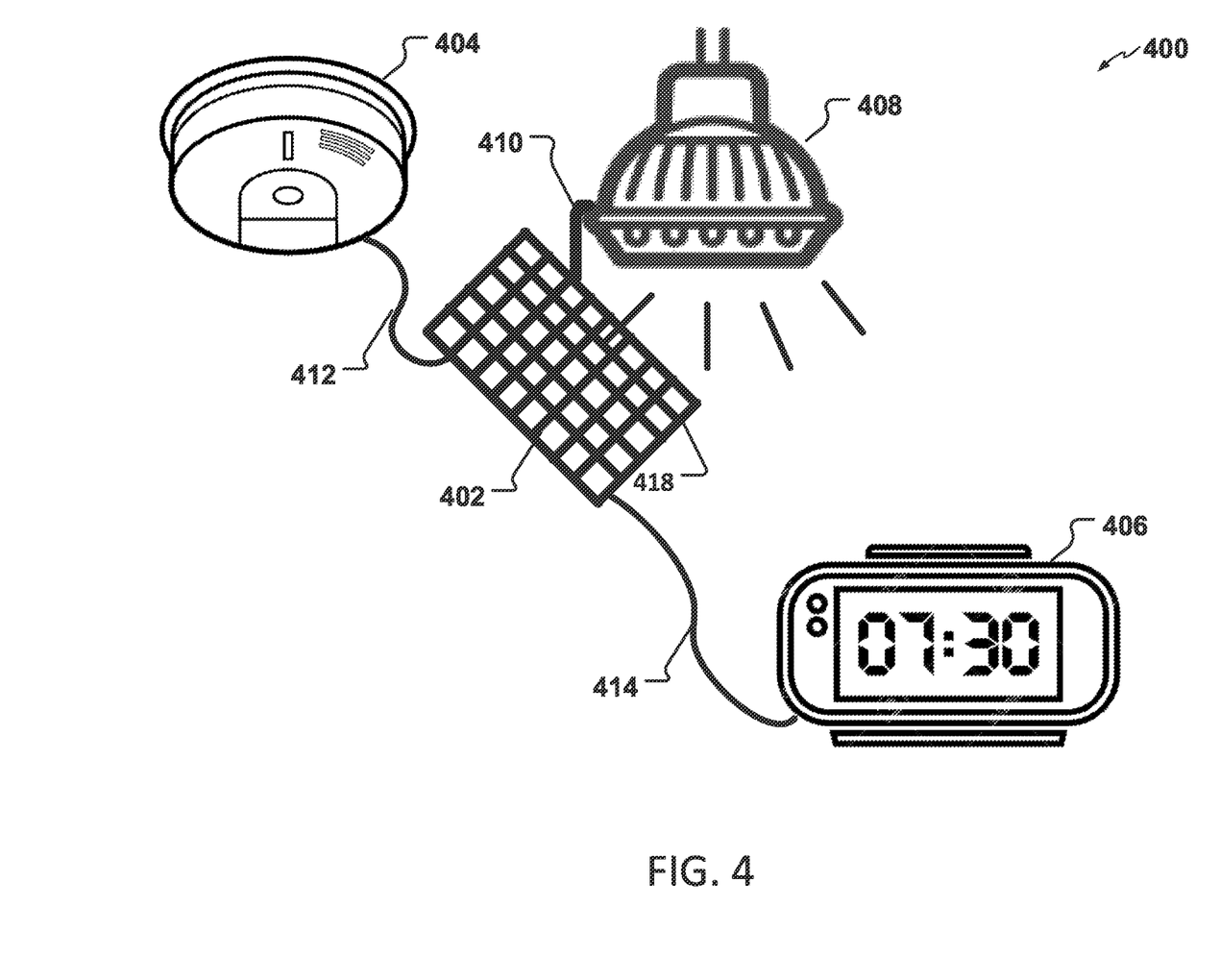
FIG. 4 is a schematic diagram illustrating a system that includes a solar panel that powers multiple IoT devices (e.g., a smoke detector and a clock)

FIG. 4 is a schematic diagram illustrating a system 400 that includes a solar panel 402 that powers multiple IoT devices 404, 406 (e.g., a smoke detector and a clock). The solar panel 402 is attached to an artificial light source 408 comprising a light emitting diode (LED) lamp using a fastener 410. For example, the fastener 410 may grip or hook onto a surface of the artificial light source 408 and hang within 10 cm of the light emanating LEDs.

The solar panel 402 may supply power to the IoT device 404, 406 using electrical connections 412, 414, respectively. The solar panel 402 may include a modular power converter and other power routing circuitry to apportion and provide power according to the load of each IoT device 404, 406. A backside surface 418 of the solar panel 402 (e.g., facing away from the artificial light source 408) may be colored or coated to minimize visual impact. For example, the backside surface 418 may be painted a ceiling white color to be less conspicuous.

Figure 5:
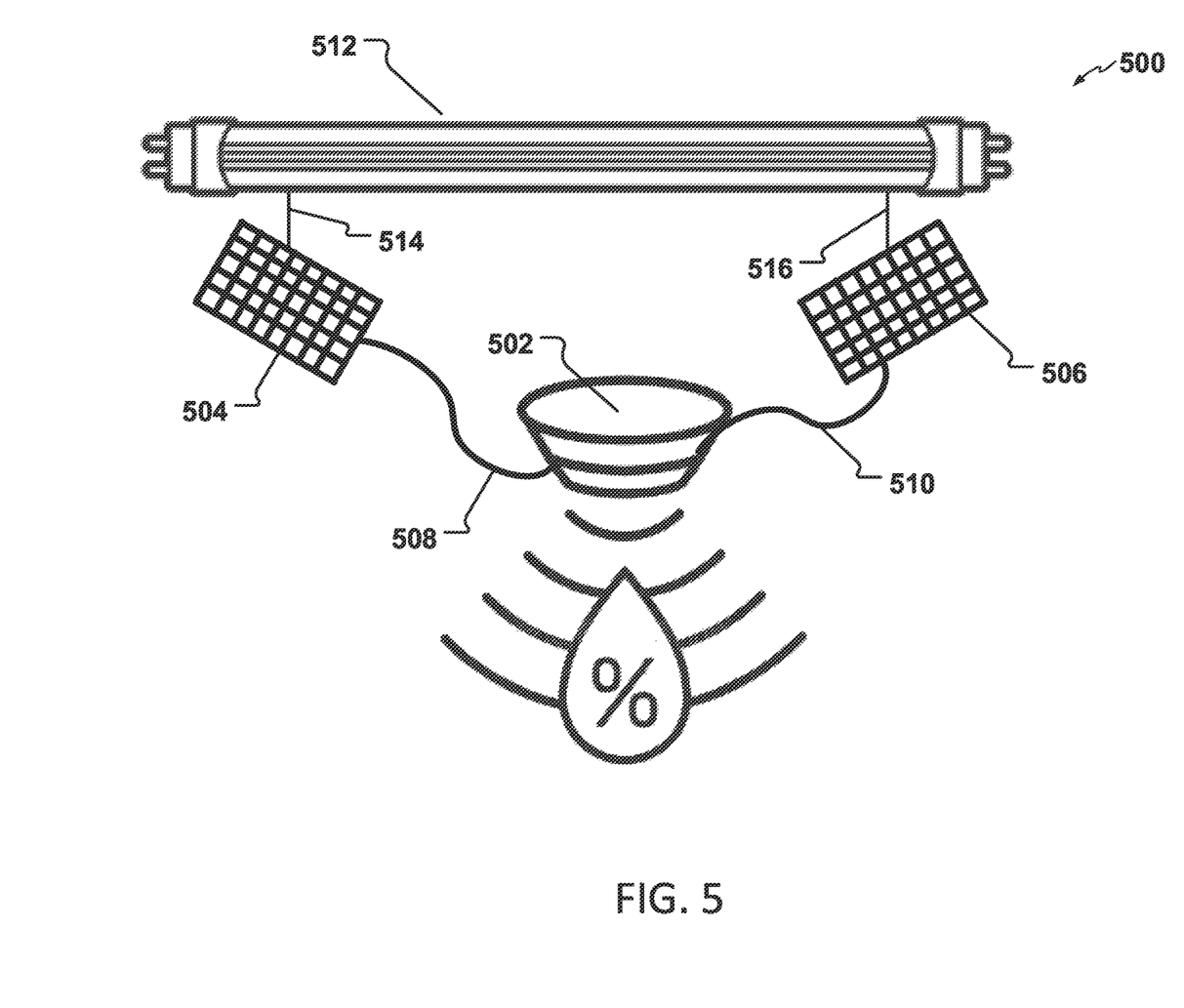
FIG. 5 is a schematic diagram illustrating a system that includes an IoT device (e.g., a humidity sensor) powered by multiple, attached solar panels.

FIG. 5 is a schematic diagram illustrating a system 500 that includes an IoT device (e.g., a humidity sensor) 502 powered by multiple, attached solar panels 504, 506. More particularly, the first solar panel 504 is coupled to via the electrical wiring 508. The second solar panel 506 is coupled to via the electrical wiring 510.

The IoT device 502 may measure the amount of water vapor in the atmosphere of air or other gasses. Humidity sensors are commonly found in heating, vents and air conditioning (HVAC) systems in both industrial and residential domains. They can be found in many other areas including hospitals, and meteorology stations to report and predict weather.

The solar panels 504, 506 may be positioned within 10 cm of an artificial light source 512. Fasteners 514, 516 may be used to position and fixate the solar panels 504, 506, respectively.

Figure 6:
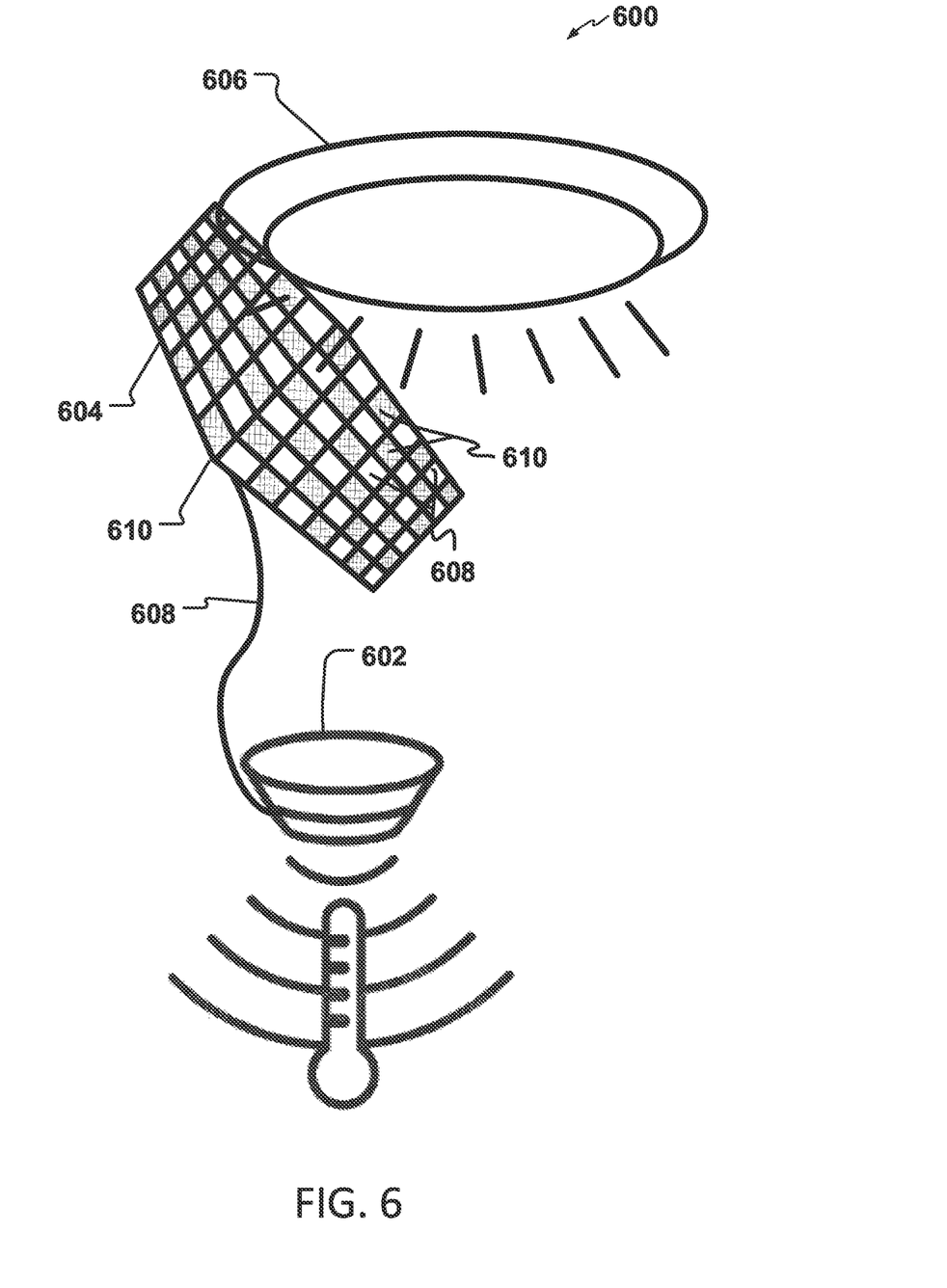
FIG. 6 illustrates a simplified schematic illustration of a system that includes an IoT device (e.g., a temperature sensor) electrically coupled to a solar panel that comprises a framework structure comprising a plurality of interconnected solar panels.

FIG. 6 illustrates a simplified schematic illustration of a system 600 that includes an IoT device 602 (e.g., a temperature sensor) electrically coupled to a solar panel 604 that comprises a framework structure comprising a plurality of interconnected solar panels. The solar panel 604 may be attached to an artificial light source 606 using a fastener (not shown). The solar panel 604 is electrically coupled to the IoT device 602 by a wire 608.

The temperature sensor IoT device 602 may measure the amount of heat energy in a source, allowing it to detect temperature changes and convert these changes to data. Machinery used in manufacturing often requires environmental and device temperatures to be at specific levels. Similarly, within agriculture, soil temperature is a key factor for crop growth.

The solar panel 604 may be rotated, oriented, or otherwise positioned within 10 cm of the artificial light source 606. For example, the solar panel 604 of FIG. 6 may be flipped open along an axis 610. As with other embodiments described in this disclosure, the 10 cm distance represents an illustrative boundary of desired positioning, but it should be understood that any increment less than 10 cm may be alternatively implemented. For complete clarity, other illustrative distances of the solar panel 604 from the artificial light source 606 may be about 9 cm, 8 cm, 7 cm, 6 cm, 5 cm, 4 cm, 3 cm, 2 cm, and around or under 1 cm.

The solar panel 604, as described herein, may comprise a framework structure comprising a plurality of interconnected solar panels. The solar panel 604 comprises apertures 612 positioned in between respective solar panels 614 (shown in crosshatch) in the framework to allow light from the artificial light source to pass through and reach a desired illuminated area. As described herein, the solar panel 604 will be positioned as close to the artificial light source 606 as is safe and plausible, as light energy can dissipate exponentially as it travels from the source.

Figure 7:
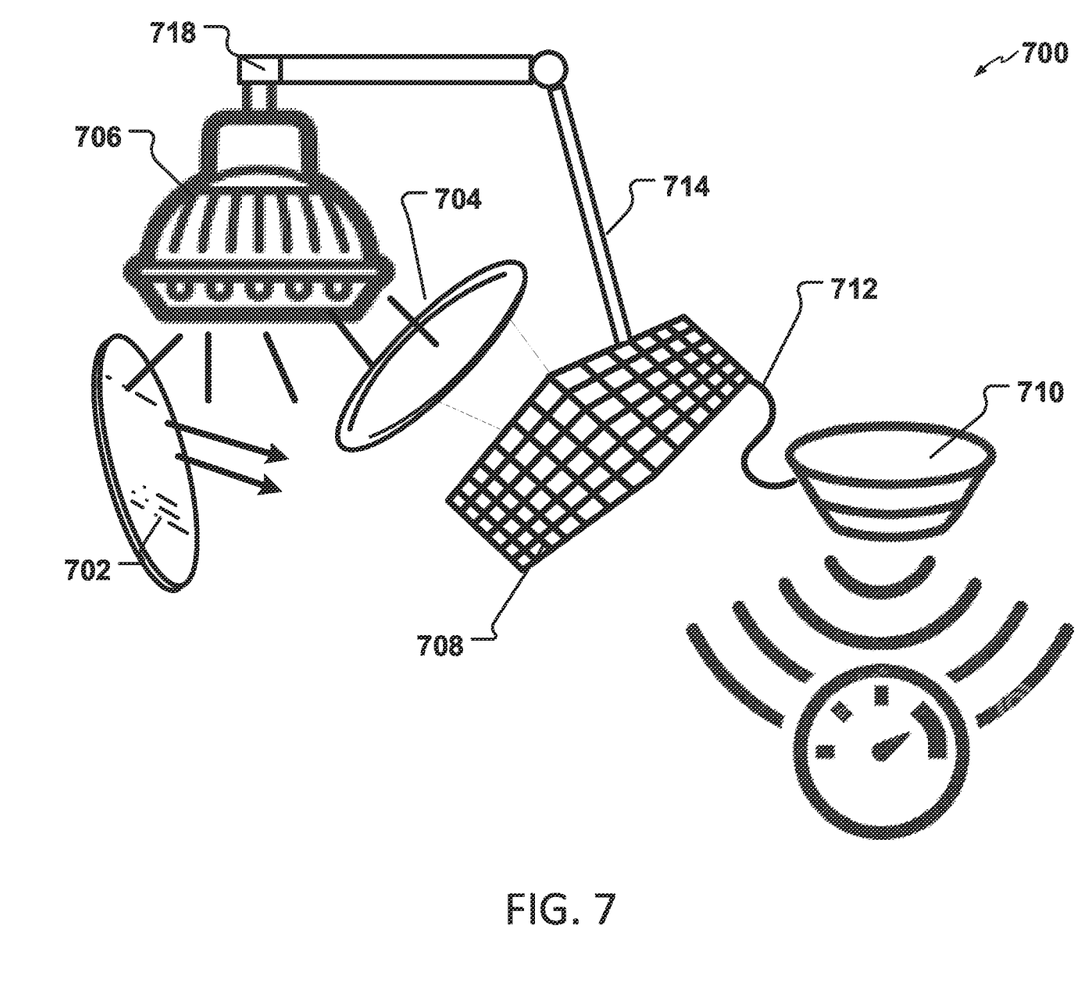
FIG. 7 is a schematic diagram of an embodiment of a system that includes a mirror and lens directing light from an artificial light source to the solar panel.

FIG. 7 is a schematic diagram of an embodiment of a system 700 that includes a mirror 702 and lens 704 directing light from an artificial light source 706 to the solar panel 708. The solar panel 708 may supply power to an IoT device 710 comprising a pressure sensor. Cabling or another wire connection 712 may be coupled to both the IoT device 710 and the solar panel 708.

The IoT device 710 may detect changes in gasses and liquids. When the pressure changes, the IoT device 710 detects these changes, and communicates them to connected systems. Common use cases include leak testing which can be a result of decay. Pressure sensors are also useful in the manufacturing of water systems as it is easy to detect fluctuations or drops in pressure.

As represented in FIG. 7, the solar panel 708 may have an adjustable surface area. For instance, the solar panel 708 may flip or fold. The solar panel 708 may be positioned using an extending arm 714 that is additionally adjustable. The lens 704 may focus light energy from the IoT device 710 onto the solar panel 708. At least one, and preferably both of the solar panel 708 and lens 704 may be positioned within 10 cm of the IoT device 710.

Figure 8:
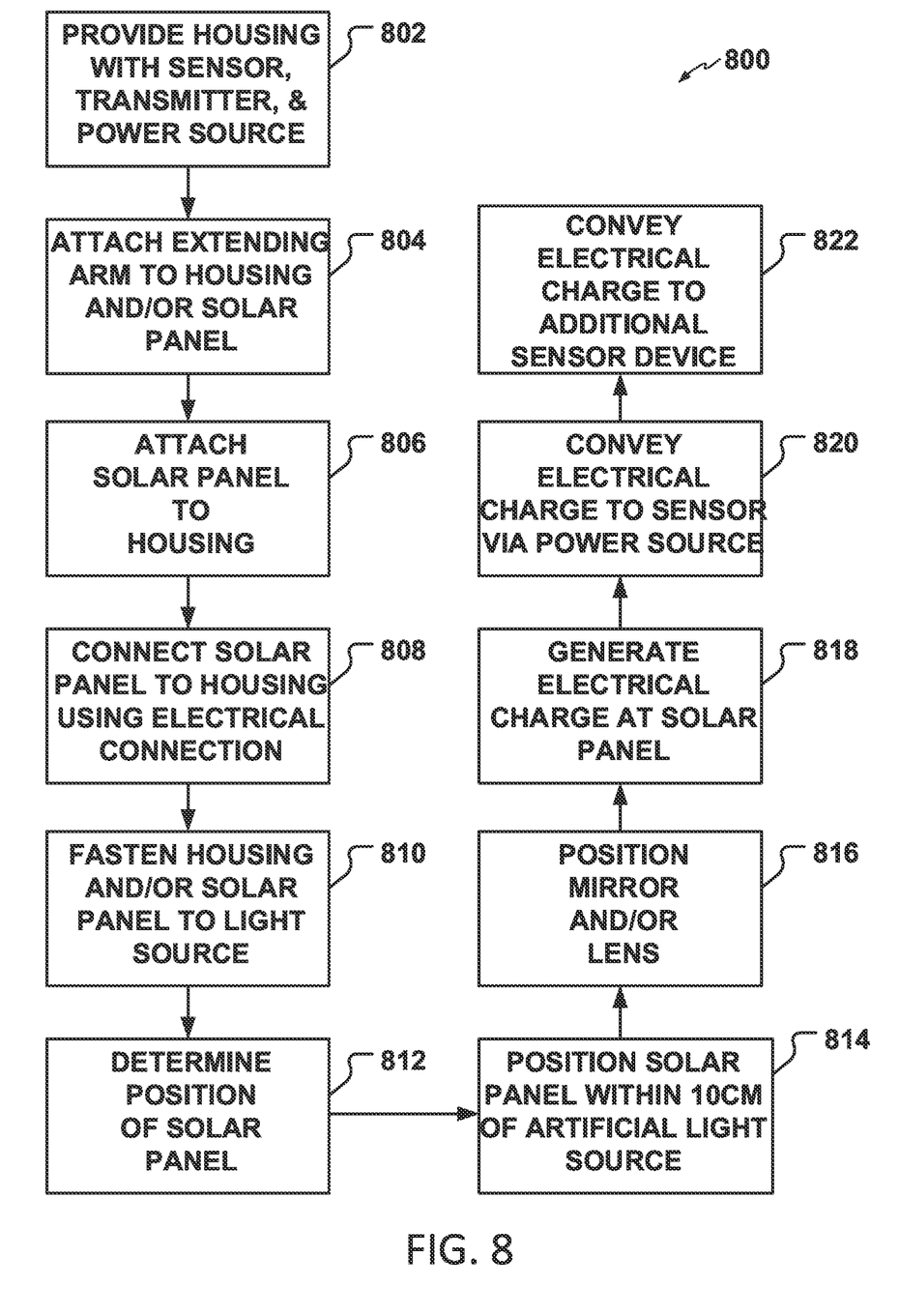
FIG. 8 is a flowchart of an embodiment of a method that may be executed by the systems described herein.

FIG. 8 is a flowchart of an embodiment of a method that may be executed by the systems described herein. For instance, the method 800 includes illustrative processes manufacturing and using a system that includes an IoT or other device that is powered by a solar panel that is positioned within a short distance of an artificial light source.

Turning more particularly to the flowchart, a manufacturer at 802 may provide a sensor housing that includes a sensor, a transmitter, and a power source. For example, a user may provide a housing such as the sensor housing 202 shown in the system 200 of FIG. 2.

At 804, an extending arm may be attached to the housing. In another or the same embodiment, the extending arm may be attached to the solar panel. In either case, the extending arm may be additionally attached to the artificial light source. For instance, the extending arm 308 of the system 300 of FIG. 3 is attached to both the artificial light source 306 and the sensor housing 302.

The solar panel may be attached at 806 to the sensor housing. For example, the solar panel 402 of the system 400 of FIG. 4 may be attached to the LED lamp IoT device 408.

At 808, the method 800 may include connecting the solar panel to housing using an electrical connection. For instance, the solar panel 402 of the system 400 of FIG. 4 is connected to the sensor housing 406 via a wire 414.

Continuing with the flowchart, the housing and/or the solar panel may be fastened to the artificial light source at 810. For example, the fastener 410 of the system 400 of FIG. 4 connects the solar panel 402 to the artificial light source 408.

At 812, the system may determine where to position the solar panel. For example, a processor may execute an application running on a personal computing device to determine an optimal distance and orientation for the solar panel with relation to the artificial light source. An embodiment of the program may also account for allowing a desired level of light from the artificial light source to illuminate an intended area.

The solar panel may be positioned at 814 within 10 cm of the artificial light source. For example, the solar panel 104 of the system 100 of FIG. 1 is positioned within 10 cm of the lamp 110.

Where so desired, a mirror or lens may be positioned at 816 to focus or redirect light on the solar panel. For instance, the system 700 of FIG. 7 includes a mirror 702 and lens 704 directing light from the artificial light source 706 to the solar panel 708.

At 818, the solar panel may convert light energy to generate electrical charge. The electrical charge may be communicated at 820 to an IoT sensor via a power source. For example, the solar panel 204 of the system 200 of FIG. 2 may provide a charge to the power source 216.

Where so configured at 820, the electrical charge may be supplied to one or more additional sensor devices. For instance, the system 400 of FIG. 4 includes a solar panel 402 that powers multiple IoT devices (e.g., a smoke detector and a clock) 404, 406.

Figure 9:
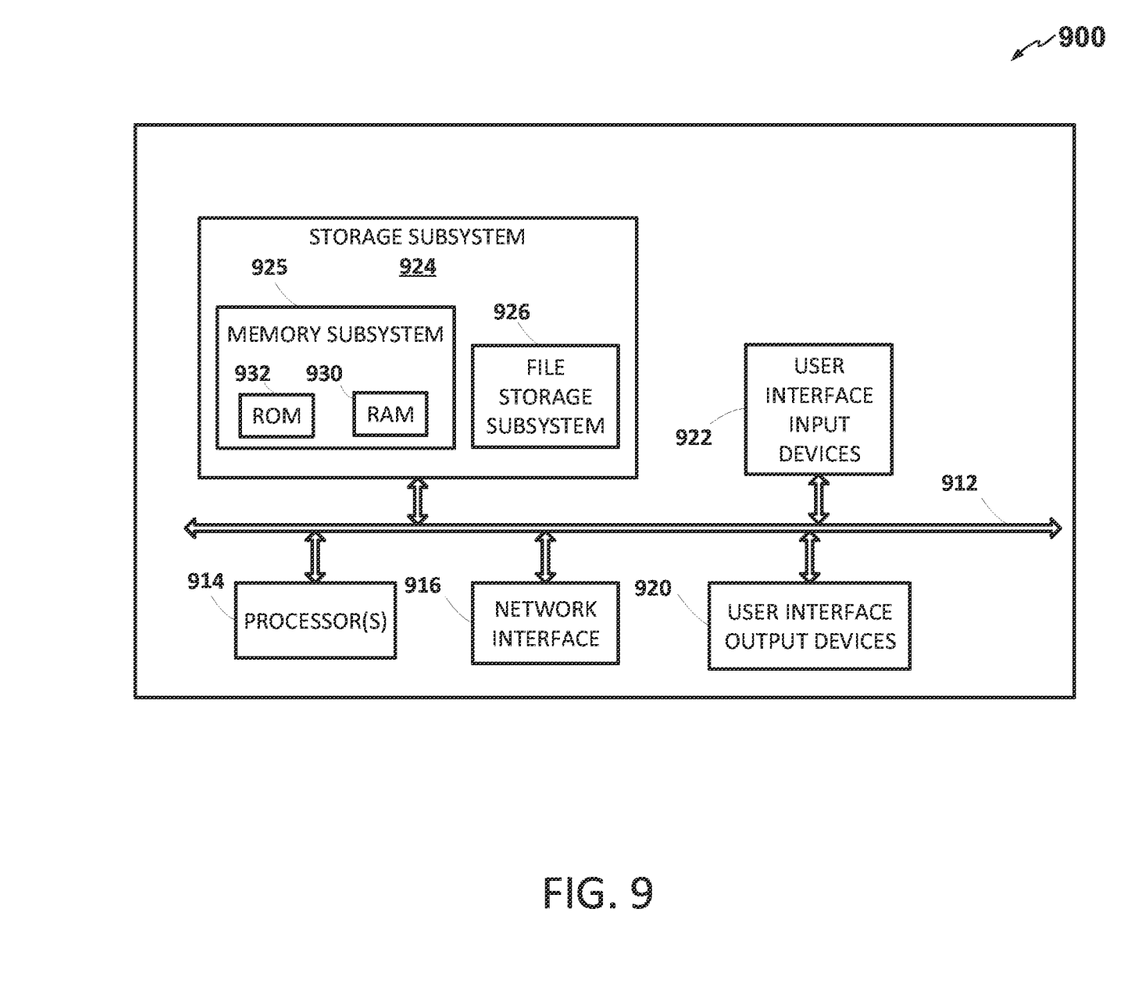
FIG. 9 illustrates an example architecture of a computing device, and more particularly, a block diagram of a system that may optionally be utilized to perform one or more aspects of techniques described herein.

FIG. 9 is a block diagram of an example computing device 900 that may optionally be utilized to perform one or more aspects of techniques described herein. In some implementations, one or more of a client computing device, user-controlled resources engine, and/or other component(s) may comprise one or more components of the example computing device 900.

Computing device 900 typically includes at least one processor 914 that communicates with several peripheral devices via bus subsystem 912. These peripheral devices may include a storage subsystem 924 that includes, for example, a memory subsystem 925 and a file storage subsystem 926, as well as a user interface output devices 920, user interface input devices 922, and a network interface subsystem 916. The user interface input devices 922 of an implementation may include a response volume setting, among other features. The input and output devices allow user interaction with computing device 900. The network interface subsystem 916 provides an interface to outside networks and is coupled to corresponding interface devices in other computing devices.

The user interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 900 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term output device is intended to include all possible types of devices and ways to output information from computing device 900 to the user or to another machine or computing device.

The storage subsystem 924 stores programming and data constructs that provide the functionality of some or all the modules described herein. For example, the storage subsystem 924 may include the logic to perform selected aspects of the method and to implement various components depicted in the preceding figures.

These software modules are generally executed by processor 914 alone or in combination with other processors. The memory subsystem 925 used in the storage subsystem 924 may include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

The bus subsystem 912 provides a mechanism for letting the various components and subsystems of computing device 900 communicate with each other as intended. Although the bus subsystem 912 is shown schematically as a single bus, alternative implementations of the bus subsystem may use multiple busses.

The computing device 900 can be of varying types including a workstation, server, computing cluster, blade server, server farm, or any other data processing system or computing device. Due to the ever-changing nature of computers and networks, the description of computing device 900 depicted in FIG. 9 is intended only as a specific example for purposes of illustrating some implementations. Many other configurations of computing device 900 are possible having more or fewer components than the computing device depicted in FIG. 9.

The terms "comprises", "comprising", "includes", "including", "having" and their conjugates mean "including but not limited to". The term "consisting of" means "including and limited to". The term "consisting essentially of" means that the composition, method, or structure may include additional ingredients, steps and/or parts, but only if the additional ingredients, steps and/or parts do not materially alter the basic and novel characteristics of the claimed composition, method, or structure. As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

It is the intent of the Applicant(s) that all publications, patents, and patent applications referred to in this specification are to be incorporated in their entirety by reference into the specification, as if each individual publication, patent, or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus comprising:
  a housing including:
    a sensor sensing an environment outside said housing,
    a transmitter; and
    a power source that energizes the sensor;
  a solar panel which is external to said housing and not included in said housing, configured to receive light energy from an artificial light source to generate an electrical charge;
  an electrical connection configured to convey the electrical charge from the solar panel located outside of said housing to the power source included in said housing; and
  a fastener configured to keep a distance between the solar panel and the artificial light source within 10 cm and such that the solar panel is lit by the artificial light source.

2. The apparatus of claim 1, wherein the solar panel is positioned with respect to the housing and the artificial light source so as to minimally obstruct visible light from the artificial light source within an area to be illuminated.

3. The apparatus of claim 1, wherein the solar panel includes a backside oriented away from the artificial light source, and wherein the backside is coated or colored to minimize visual impact of the backside.

4. The apparatus of claim 1, wherein the fastener includes at least one of: an adhesive, a threaded surface, a hook and loop fastener, tape, a snap, a mating connection, a clamp, a bolt, a pin, a retaining ring, a band, and a strap.

5. The apparatus of claim 1, wherein the solar panel is directionally adjustable.

6. The apparatus of claim 1, wherein a surface area of the solar panel is manually adjustable.

7. The apparatus of claim 1, further comprising a lens attached to at least one of the housing and the solar panel, the lens configured to focus the light energy onto the solar panel.

8. The apparatus of claim 7, wherein the lens is at least one of a magnifying lens and a Fresnel lens.

9. The apparatus of claim 1, further comprising an adjustable extending arm connecting the solar panel to the housing.

10. The apparatus of claim 1, further comprising an adjustable extending arm connecting the housing to the artificial light source.

11. The apparatus of claim 9, wherein the adjustable extending arm is configured to be at least one of: telescoping, rotating, and pivoting.

12. The apparatus of claim 1, wherein a first surface of the fastener is integral with the housing and a second surface of the fastener is attachable to the artificial light source.

13. The apparatus of claim 1, wherein the fastener attaches the artificial light source to at least one of the solar panel and the housing.

14. The apparatus of claim 1, wherein an optimal distance and orientation for the solar panel with relation to the artificial light source is determined using a processor executing an application running on a personal computing device.

15. The apparatus of claim 1, wherein a positioning of at least one of the solar panel and the housing is adjusted based on a potential light energy exposure and a potential obstruction of light from an illuminated area.

* * * * *